(12) United States Patent
Calcev

(10) Patent No.: US 7,394,774 B2
(45) Date of Patent: *Jul. 1, 2008

(54) METHOD AND APPARATUS FOR ROUTE DISCOVERY WITHIN A COMMUNICATION SYSTEM

(75) Inventor: George Calcev, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 671 days.

This patent is subject to a terminal disclaimer.

(21) Appl. No.: 10/964,943

(22) Filed: Oct. 14, 2004

(65) Prior Publication Data

US 2005/0094620 A1 May 5, 2005

Related U.S. Application Data

(60) Provisional application No. 60/515,596, filed on Oct. 30, 2003.

(51) Int. Cl.
*H04L 12/28* (2006.01)

(52) U.S. Cl. ................................ 370/254; 370/351

(58) Field of Classification Search ................ None
See application file for complete search history.

(56) References Cited

U.S. PATENT DOCUMENTS

| 6,275,470 | B1 | 8/2001 | Ricciulli |
| 6,304,556 | B1 | 10/2001 | Haas |
| 2004/0264422 | A1 | 12/2004 | Calcev et al. |

*Primary Examiner*—Chau T. Nguyen
*Assistant Examiner*—Sori A Aga
(74) *Attorney, Agent, or Firm*—Kenneth A. Haas

(57) ABSTRACT

During route discovery in an ad-hoc communication network, an overlay transceiver (104) determines a plurality of "seed" nodes that lie between the source and the destination node. The seed nodes are notified of the desire to discover a route between the source and the destination node. Once notified, the seed nodes immediately broadcast route discovery messages. All nodes (101) within the underlay communication system (110) periodically listen for route discovery messages. If any node within the underlay communication system (110) receives a route discovery message having the same route identification, route information between the two seeds will be provided to the overlay transceiver (104), giving the overlay communication system a "path" between the seeds. Once the overlay transceiver (104) receives route information between all seeds, it then determines an appropriate route between source and destination devices, and broadcasts this information to the source and the destination devices.

11 Claims, 7 Drawing Sheets

100

METHOD AND APPARATUS FOR ROUTE DISCOVERY WITHIN A COMMUNICATION SYSTEM

FIELD OF THE INVENTION

The present invention relates generally to communication systems and in particular, to a method and apparatus for route discovery within such communication systems.

BACKGROUND OF THE INVENTION

Route discovery within a communication system is well known. In particular, a message flooding procedure occurs that is often the basis of on-demand route discovery and network initialization. Message flooding is basically defined as a broadcast procedure covering a complete network. It operates as follows: When a node, or remote unit, in a network wishes to discover a route to another node in the network a message is broadcasted to all of its neighbors specifying the destination address. Upon receiving the message, all of the neighboring nodes will rebroadcast the message to their neighbors. When a node receives the same message again, it discards it. The procedure repeats itself until all of the nodes in the network are reached, or a time-to-live for the message expires. As discussed, the purpose to flood the network in a routing algorithm is essentially to find a path to send data to destinations. The message content is usually a request of route discovery.

Although message flooding is a dependable way to find a route within the network, flooding is proven to generate excessive amounts of system traffic and interference. In particular, the exponential increase of the signaling messages, due to the fact that every host in the searched area has the obligation to rebroadcast the route-discovery packet, leads to serious redundancy, contention, and collision. Therefore, a need exists for a method and apparatus for route discovery within a communication system that minimizes system interference caused by message flooding.

DETAILED DESCRIPTION OF THE DRAWINGS

Figure 1:
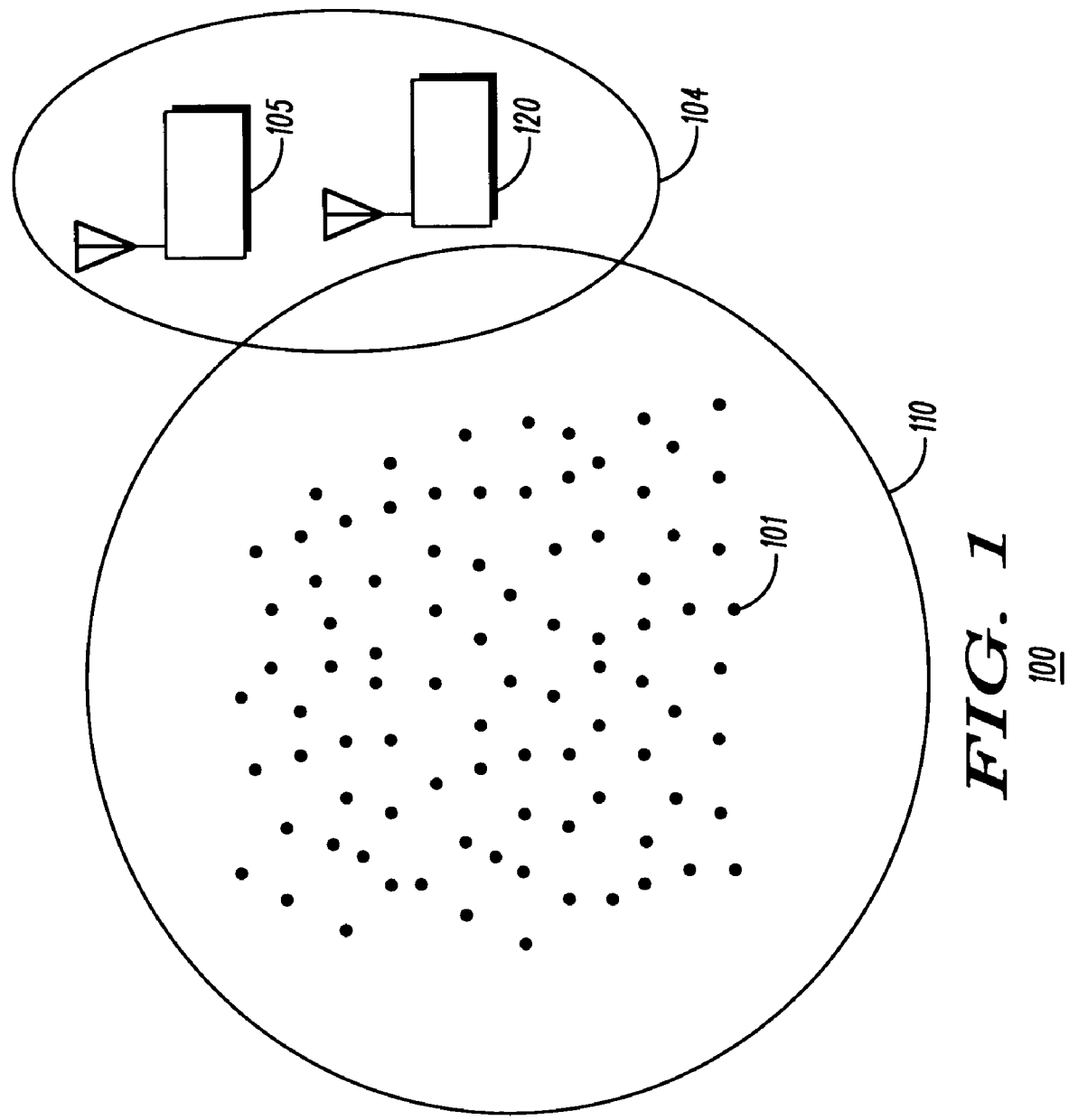
FIG. 1 is a block diagram of a communication system.

To address the need for route discovery within a communication system, a method and apparatus for flooding is provided herein. During route discovery in an ad-hoc communication network, an overlay transceiver determines a plurality of "seed" nodes that lie between the source and the destination node. The seed nodes are notified of the desire to discover a route between the source and the destination node. Once notified, the seed nodes immediately broadcast route discovery messages. If any node within the underlay communication system receives a route discovery message having the same route identification, route information between the two seeds will be provided to the overlay transceiver, giving the overlay communication system a "path" between the seeds. Once the overlay transceiver receives route information between all seeds, it then determines an appropriate route between source and destination devices, and broadcasts this information to the source and the destination devices. Because message flooding takes place simultaneously from all seeds within underlay communication system 110, message flooding is greatly reduced.

The present invention encompasses a method of operating an overlay communication system. The method comprises the steps of receiving a route needed message from a first node in an underlay communication system, wherein the route-needed message notifies the overlay communication system that a route is needed between the first and a second node within the underlay communication system. Locations are determined for seed nodes within the underlay communication system and a message is transmitted to the seed nodes causing the seed nodes to begin broadcasting route discovery messages. Next, a plurality of route segments from nodes within the underlay communication system is received and a route is determined based on the route segments. Finally the rout is transmitted to at least the first node within the underlay communication system.

The present invention additionally encompasses a method for operating a node within an ad-hoc communication system. The method comprises the steps of receiving a first route-discovery message, determining from the first route-discovery message, an identification of a first seed node that originated the first route-discovery message, determining a first route identifier from the first route-discovery message, and determining if a prior-received route-discovery messages was received from a differing seed node containing a similar route identifier. Route information obtained from the two route-discovery messages is transmitted to an overlay communication system based on a determination that a prior-received route-discovery messages was received from a differing seed node containing a similar route identifier.

The present invention additionally encompasses an apparatus existing within an overlay communication system. The apparatus comprises a receiver, receiving a plurality of route segments from a plurality of nodes within an underlay communication system, logic circuitry determining a route between a first and a second node within the underlay communication system, wherein the route is determined from the plurality of route segments, and a transmitter, transmitting the route to the first node within the underlay communication system.

The present invention additionally encompasses an apparatus existing within an underlay communication system. The apparatus comprises a receiver receiving a first and a second route-discovery message from a first and a second node, logic circuitry determining a first and a second route identifier from the first and the second route-discovery messages, and additionally determining if the first and the second route identifiers are similar, and transmission circuitry transmitting route information obtained from the first and the second route-discovery messages when the first and the second route identifiers differ.

Turning now to the drawings, wherein like numerals designate like components, FIG. 1 is a block diagram of communication system 100. Communication system 100 comprises ad-hoc underlay communication system 110, that is preferably a neuRFon™ communication system, available from Motorola, Inc. (www.motorola.com) that is modified to perform the functionality set forth below. However, in alternate embodiments of the present invention, underlay communication system 110 may comprise any ad-hoc network, such as, but not limited to a WLAN network typically utilizing IEEE 802.11b ad hoc networking protocols or RoofTop™ Wireless Routing mesh network manufactured by Nokia, Inc. Communication system 100 additionally comprises overlay communication system 120 such as a cellular Code Division, Multiple Access (CDMA) communication system.

As shown, communication system 110 comprises plurality of nodes 101. Plurality of nodes 101 form an underlay communication network, with each node 101 capable of short-range communication to neighboring nodes only. Overlay communication system 120, comprising a plurality of transceivers 104-105, is capable of communicating with each node 101 of underlay communication network 110. In the preferred embodiment of the present invention transceivers 104-105 are preferably cellular base stations, however, in alternate embodiments, transceivers 104-105 may comprise other transmission/reception equipment such as beacons.

As one of ordinary skill in the art will recognize, transmissions between two nodes within underlay communication system 110 generally take place through intervening nodes, with the intervening nodes receiving a source transmission, and "repeating" the source transmission until the source transmission reaches its destination node. Thus, a first node, wishing to transmit information to a second node, must first determine a route (i.e., those intervening nodes) between the first and the second node. In prior-art systems, this is accomplished via message flooding.

As discussed above, message flooding is a dependable way to find a path within communication system 100, however, flooding generates an excessive amount of system interference. In order to address this issue, in the preferred embodiment of the present invention overlay communication system 120 aids in route determination for underlay communication system 110. In particular, when a first node within communication system 110 desires to determine route information to a second node, the first node transmits a route-needed (RT_NEED) to a transceiver (e.g., transceiver 104) within communication system 120. The route-needed message notifies overlay communication system 120 of the desire to determine a route from the first node to the second node. In the preferred embodiment of the present invention the RT_NEED message comprises the identity of the first node and the identity of the second node.

Once overlay transceiver 104 receives the route needed message, transceiver 104 performs gross location estimates for all nodes within underlay communication system 110. Gross location may be accomplished via various location techniques, including, but not limited to Angle of Arrival (AOA) techniques, Time-Difference of Arrival (TDOA), triangulation, . . . , etc. Once gross location for all nodes within communication system 110 is determined, overlay transceiver 104 determines a plurality of "seed" nodes (inclusive of the source and destination nodes) that lie between the source and the destination node. The seed nodes are notified (via a SEED_NOTIF message) of the desire to discover a route between the source and the destination node. The SEED_NOTIF message comprises a unique seed identifier for each seed node, along with a route discovery identification number, uniquely identifying the route attempting to be discovered. Once a SEED_NOTIF message is received by a seed, the seed immediately broadcasts a route discovery (RT_DISC) message. Within the RT_DISC message, the seed nodes include the route identification and the identification of the seed node. Thus, the result of any node notifying overlay transceiver 104 of the need for route discovery, is that a plurality of seed nodes begin broadcasting route discovery messages.

All nodes 101 within underlay communication system 110 periodically listen for RT_DISC messages. Once a RT_DISC message is received by a node, the node inspects the message to determine the originating "seed" and the route discovery identification number. If any node within underlay communication system 110 receives a RT_DISC message, the node will store the information included within the RT_DISC message. A determination will then be made if any other RT_DISC messages were received from other seeds having the same route identification. If so, route information between the two seeds will be provided to overlay transceiver 104, giving overlay communication system a "path" between the seeds via a RT_INFO message. In response, overlay communication system may instruct nodes within the geographic area of the two seeds to cease transmitting RT_DISC messages.

Once overlay transceiver 104 receives route information between all seeds, overlay transceiver 104 then broadcasts a message (FLOOD_STOP) instructing all nodes within underlay communication system 110 to stop message flooding, thus limiting the signaling and the interference in the system. Overlay transceiver 104 then determines an appropriate route between the first and the second (source and destination) devices, and broadcasts this information to the source and the destination device via a RT_INFO message to the first node so that communication can take place between the first and the second nodes.

Figure 2:
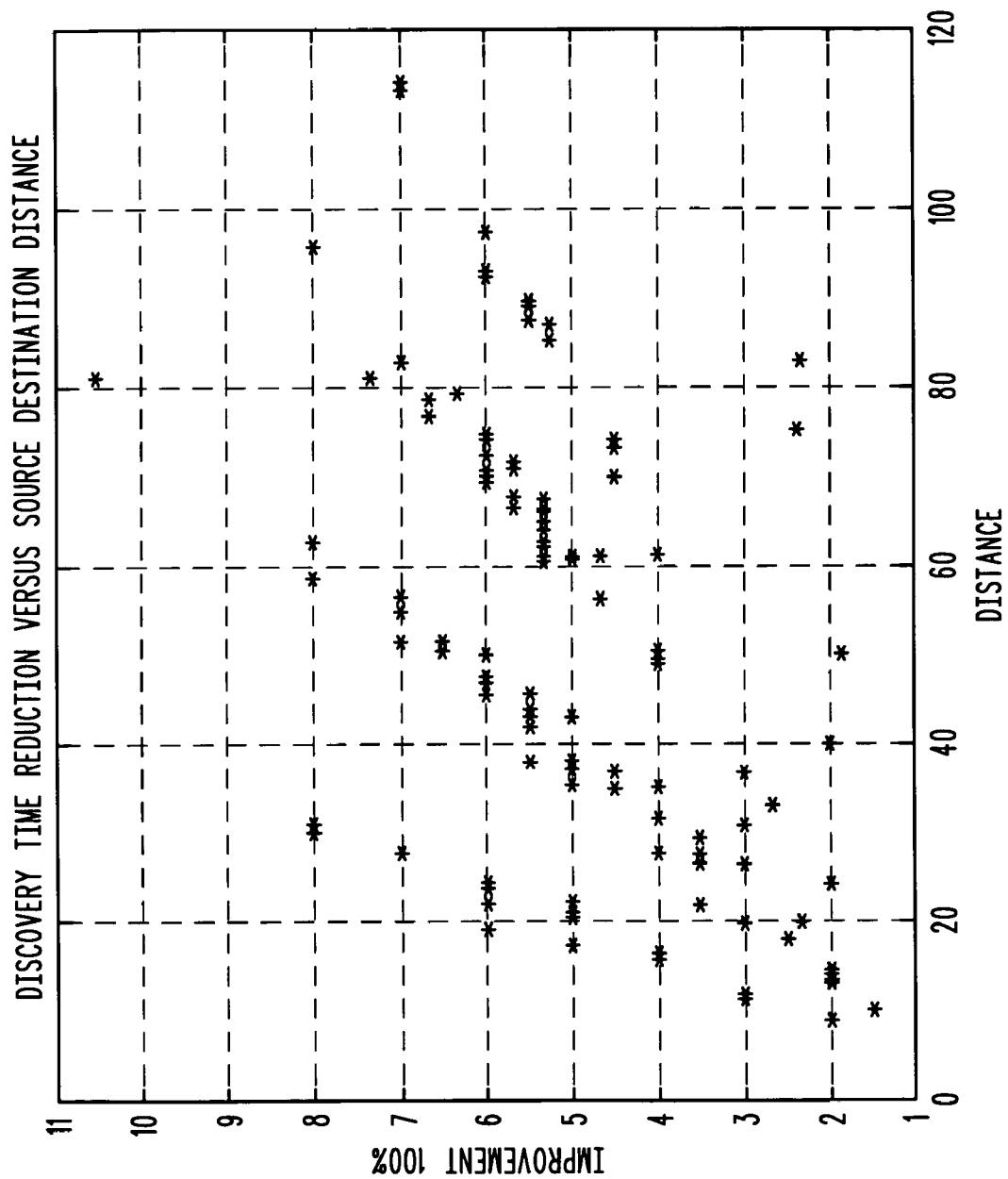
FIG. 2 is a graph of discovery-time reduction versus source-destination distance.

Because message flooding takes place simultaneously from all seeds within underlay communication system 110, message flooding is greatly reduced. In fact, simulations have shown the average value of improvement in the number of search steps is 5.025 times with a standard deviation of 1.61 times, while the decrease in the number of flooded nodes is 14.71 times with as std of 8.27 times. System improvement is shown in FIG. 2, with FIG. 2 being a graph of discovery time reduction versus source-destination distance (in hops).

Figure 3:
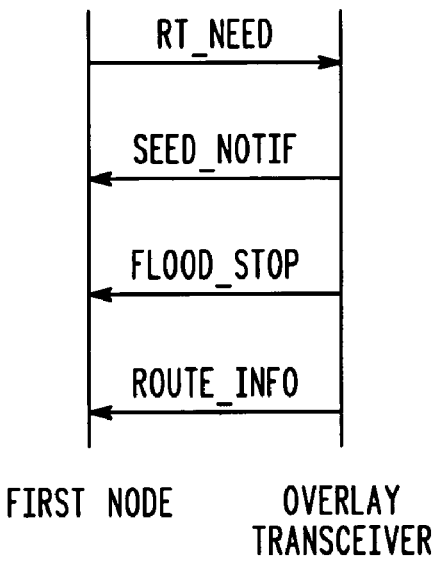
FIG. 3 through FIG. 5 show various message-flow diagrams for the communication system of FIG. 1.

FIG. 3 is a message flow diagram showing route discovery in accordance with the preferred embodiment of the present invention. In particular, FIG. 3 shows messaging that takes place between a first node wishing to discover a route to a second node, and a transceiver within an overlay communication network. As shown, when the node wishes to discover a route, the node transmits a route-needed (RT_NEED) message to transceiver 104. In response, transceiver 104 transmits a SEED_NOTIF message instructing seed nodes within communication system 110 to begin normal route discovery procedures. In particular, all seed nodes will initiate RT_DISC messages. Each node that receives a route discovery message (RT_DISC) that is not a duplicate of a previous (RT_DISC) message will rebroadcast the route discovery message (RT_DISC) until a time-to-live for the broadcasted message occurs. As discussed above, normal scheduling and flood messaging takes place, except that in the preferred embodiment of the present invention when a third node receives the (RT_DISC) flood message from two seed nodes having the same route identifier, the route information is provided to transceiver 104, causing transceiver 104 to broadcast a flood-stop (FLOOD_STOP) message to all nodes within the geographic area of the two seeds. When route information between all seeds is obtained by transceiver 104, route information is provided to the first node via a route information (RT_INFO) message. In the preferred embodiment of the present invention the route information message comprises information such as a sequence of intervening IP addresses corresponding to each node from the first node to the second node.

Figure 4:
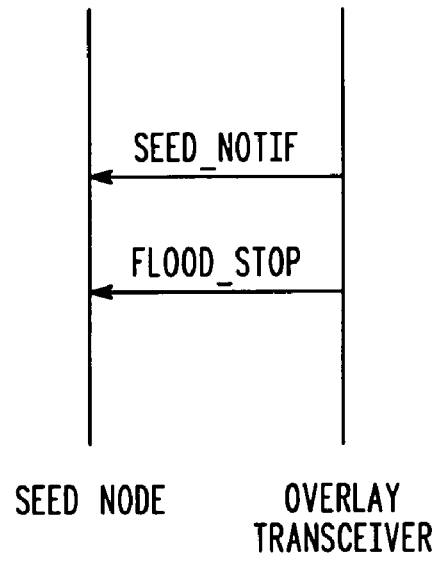

FIG. 4 is a message flow diagram showing the messages that flow between transceiver 104 and a seed node. As discussed above, a first node wishes to discover a route to the second node, and initiates a route-needed message (RT_NEED) to transceiver 104. The seed node is first made aware of the desire for communication via a route-discovery aware (SEED_NOTIF) message broadcast from transceiver 104. In response, the seed node initiates normal route discovery procedures using (RT_DISC) messages to flood communication system 110. As discussed above, the RT_DISC message contains a particular route identifier as well as the identification of the particular seed node that originated the message. When a third node receives a (RT_DISC) flood message from two seed nodes, it transmits a route information (RT_INFO) message to transceiver 104 causing a flood-stop (FLOOD_STOP) message to be sent to all nodes within its geographic area.

Figure 5:
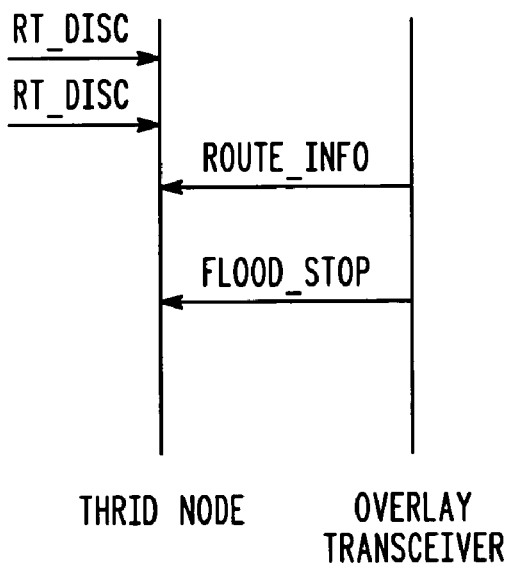

FIG. 5 is a message flow diagram showing the messaging that flows between transceiver 104 and the third node. As discussed above, a first node wishes to discover a route to the second node, and initiates a route-needed (RT_NEED) message to transceiver 104 causing seed nodes to begin flooding RT_DISC messages. The third node, during periodic monitoring for RT_DISC messages, receives two RT_DISC messages from differing seeds, each having the same route identifier. In response, the third node informs transceiver 104 via a route-information (RT_INFO) message causing a flood-stop (FLOOD_STOP) message to be sent to all nodes within the geographic area of the third node.

Figure 6:
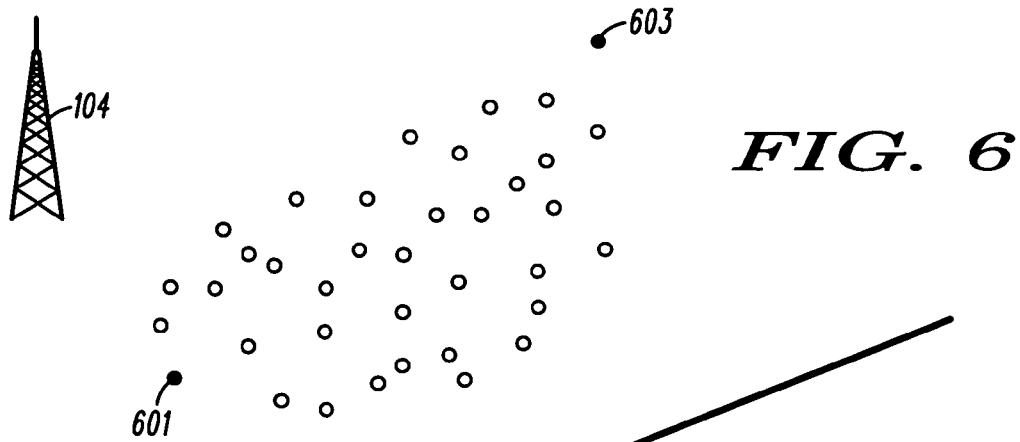
FIG. 6 through FIG. 8 illustrate message flooding for the communication system of FIG. 1.
Figure 7:
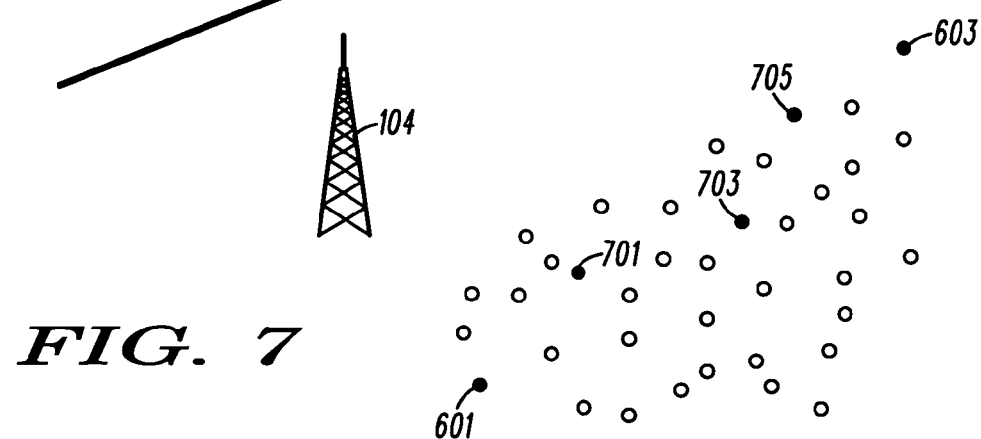
Figure 8:
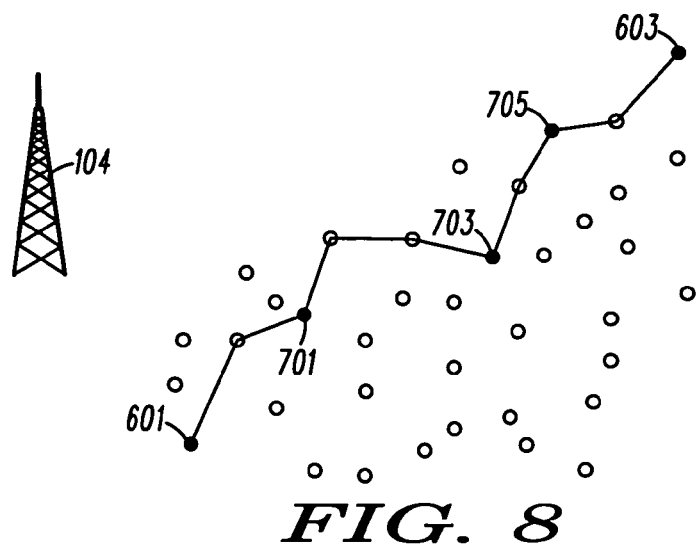

The above-described procedures are illustrated in FIG. 6 through FIG. 8. With reference to FIG. 6, node 601 wishes to discover a route to node 603. By informing overlay transceiver 104 of this fact, transceiver 104 determines geographic locations for all nodes within the underlay communication system and determines which nodes are to become seed nodes. In determining which nodes are to become seed nodes, transceiver 104 may use such criteria as node density, node's distance from the straight line that connects source and target, propagation data, node's activity, traffic patterns, node's battery level, node's mobility (for instance fixed relays could be preferred to the mobile nodes), etc. The proper selection of the seeds, based on their mobility, battery level, or traffic loads improves the overall throughput in the system as well as the route reliability and availability. In the preferred embodiment of the present invention seeds are chosen to be those units nearest a straight line connecting the source (node 601) and the destination nodes (node 603). More particularly, The seed selection is made so that the seeds are close to the straight line between source and target, if there are no additional information about the propagation conditions between source and target. The number of seeds is proportional to the distance between source and the target.

Continuing, and with reference to FIG. 7, nodes 701-705 have been identified as seed nodes, along with nodes 601 and 603 (the source and destination nodes are always seed nodes). When informed of their seed-node status, seed nodes 601-603, and 701-705 immediately begin broadcasting route discovery messages. As discussed above, when an arbitrary node in the ad-hoc network receives messages from two seeds containing the same route identifier, it sends the overlay network a message containing the ID list of the discovered nodes that are located between those two seeds. The list of discovered nodes constitutes a route segment. The overlay transceiver 104 stops the search when all the route segments between source and target are identified. This is illustrated in FIG. 8.

In alternate embodiments, the overlay system can decide to obtain backup route segments for unreliable segments based on some link history. Additionally, time to live (TTL) for the search packets should be set at 1/N of the total expected value, where N is the number of seeds in the algorithm. If the ad-hoc density is non-uniform, the overlay network could set up different TTL for the source and the target as follows: for the node surrounded by a lower ad-hoc density the TTL should be greater and for the node surrounded by a higher node density the TTL should be smaller. Still their sum should be equal with the expected length of the route between source and target.

The searching time could be potentially reduced in 1/N. The potential time gain though diminishes a little by the increase number of signaling (channel request) around the intermediate node. Therefore, this method is more attractive when the number of hops between target and destination is medium or high. When the distance to the target is only 2-3 nodes (i.e. TTL very small) the search should be unidirectional from the either target or source, which one is surrounded by a lower density of nodes. During the normal traffic, if a route is disrupted, the overlay network will initiate the re-discovery of the damaged segment. The discovery will be initiated from the seeds that define the respective segment. If one or both segment's seeds are unavailable, the overlay network (agent) will select new seeds from the adjacent segments.

Figure 9:
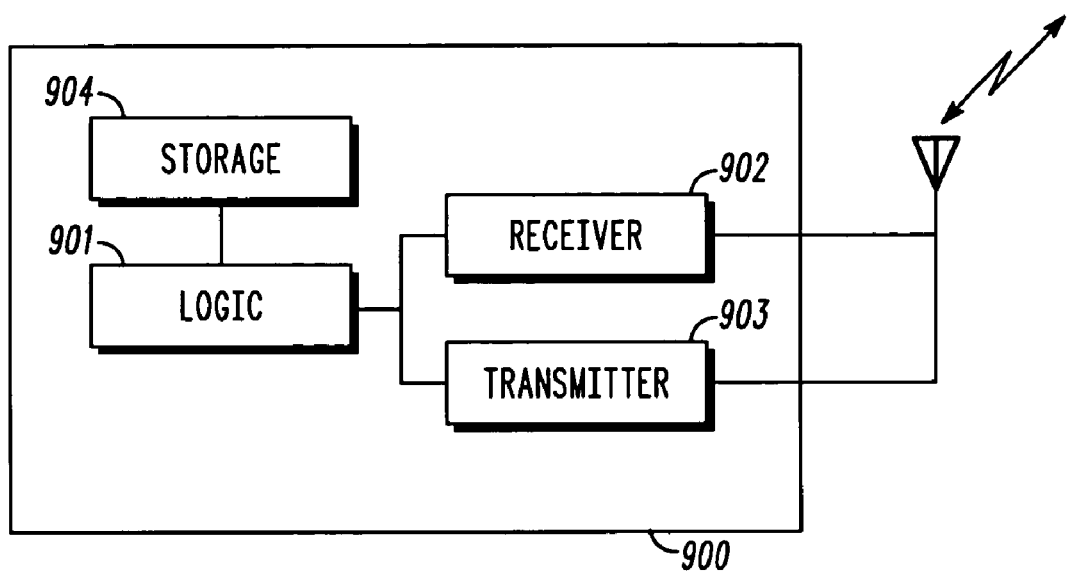
FIG. 9 is a block diagram of a transceiver.

FIG. 9 is a block diagram of transceiver 900 in accordance with the preferred embodiment of the present invention. In the preferred embodiment of the present invention all nodes 101 and transceivers 104-105 contain the elements shown in transceiver 900. As shown, transceiver 900 comprises logic circuitry 901, receive circuitry 902, transmit circuitry 903, and storage 904. Logic circuitry 901 preferably comprises a microprocessor controller, such as, but not limited to a Motorola PowerPC microprocessor. Logic circuitry 901 serves as means for controlling transceiver 900, means for analyzing message content to determine any actions needed, and means for determining route information between nodes given a plurality of route segments. Additionally receive and transmit circuitry 902-903 are common circuitry known in the art for communication utilizing a well known communication protocol, and serve as means for transmitting and receiving messages. For example, for nodes 101-103, receiver 902 and transmitter 903 are well known neuRFon™ elements that utilize the neuRFon™ communication system protocol. Other possible transmitters and receivers include, but are not limited to transceivers utilizing Bluetooth, IEEE 802.11, or HyperLAN protocols. Similarly, for transceivers 104 and 105, receiver 902 and transmitter 903 are well known elements that utilize the overlay communication system protocol (e.g., CDMA, TDMA, GSM, WCDMA, . . . , etc.).

Transceiver 900 may serve as:
  a node wishing to discover a route to another node,
  a seed node aiding in route discovery between two differing nodes,
  a non-seed node aiding in route discovery between two differing nodes, and
  a transceiver in an overlay communication system participating in route discovery.

Flow charts detailing operation of transceiver 900 for these four scenarios are shown in FIG. 10 through FIG. 13.

Figure 10:
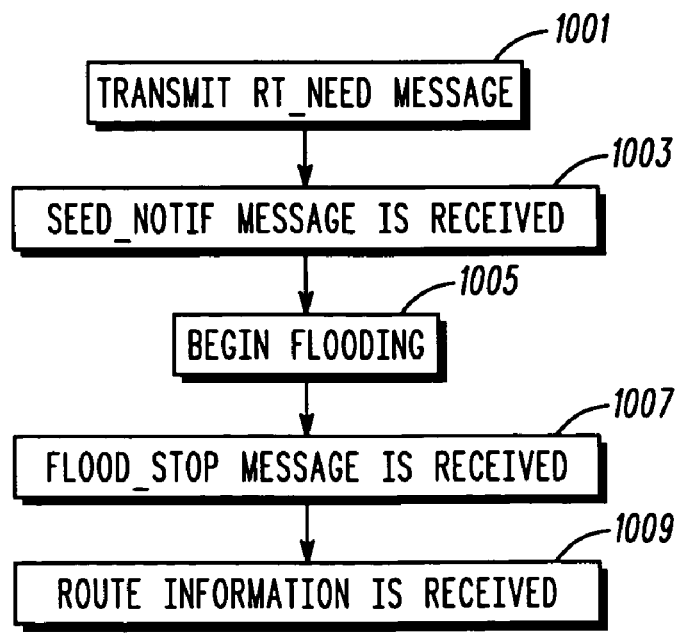
FIG. 10 through FIG. 13 show flow charts detailing operation of the communication system of FIG. 1.

FIG. 10 is a flow chart showing operation of node 900 acting as a first node that wishes to discover a route to a second node. The logic flow begins at step 1001 where the first node, utilizing transmitter 901, transmits a RT_NEED message to overlay communication system informing the overlay communication system of the need to discover a route between the first and the second nodes. At step 1003, a SEED_NOTIF message is received by receiver 902. As discussed above, the SEED_NOTIF message assigns the first node a unique seed node identifier as well as a route identifier for the particular route being discovered. Upon receipt of the SEED_NOTIF message, logic circuitry 901 instructs transmitter 903 to begin transmitting flood messages (step 1005). As discussed above, when any node receives two flood messages from differing seeds, and having the same route identifier, the route information is passed to the overlay communication system and flooding stops for that geographic area. Thus, at step 1007 a FLOOD_STOP message is received by receiver 902, and at step 1009, route information is received by receiver 902 from the overlay communication system.

Figure 11:
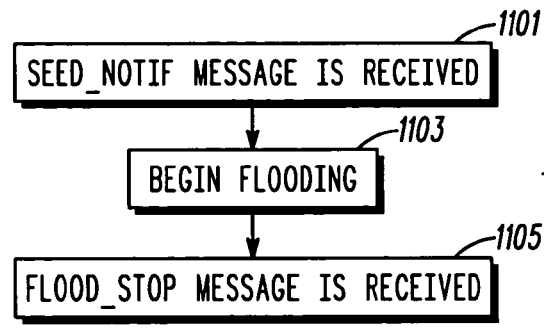

FIG. 11 is a flow chart showing operation of node 900 acting as a seed node. The logic flow begins at step 1101 where a SEED_NOTIF message is received by receiver 902. Upon receipt of the SEED_NOTIF message, logic circuitry 901 instructs transmitter 903 to begin transmitting flood messages (step 1103). As discussed above, when any node receives two flood messages from differing seeds, and having the same route identifier, the route information is passed to the overlay communication system and flooding stops for that geographic area. Thus, at step 1105 a FLOOD_STOP message is received by receiver 902.

Figure 12:
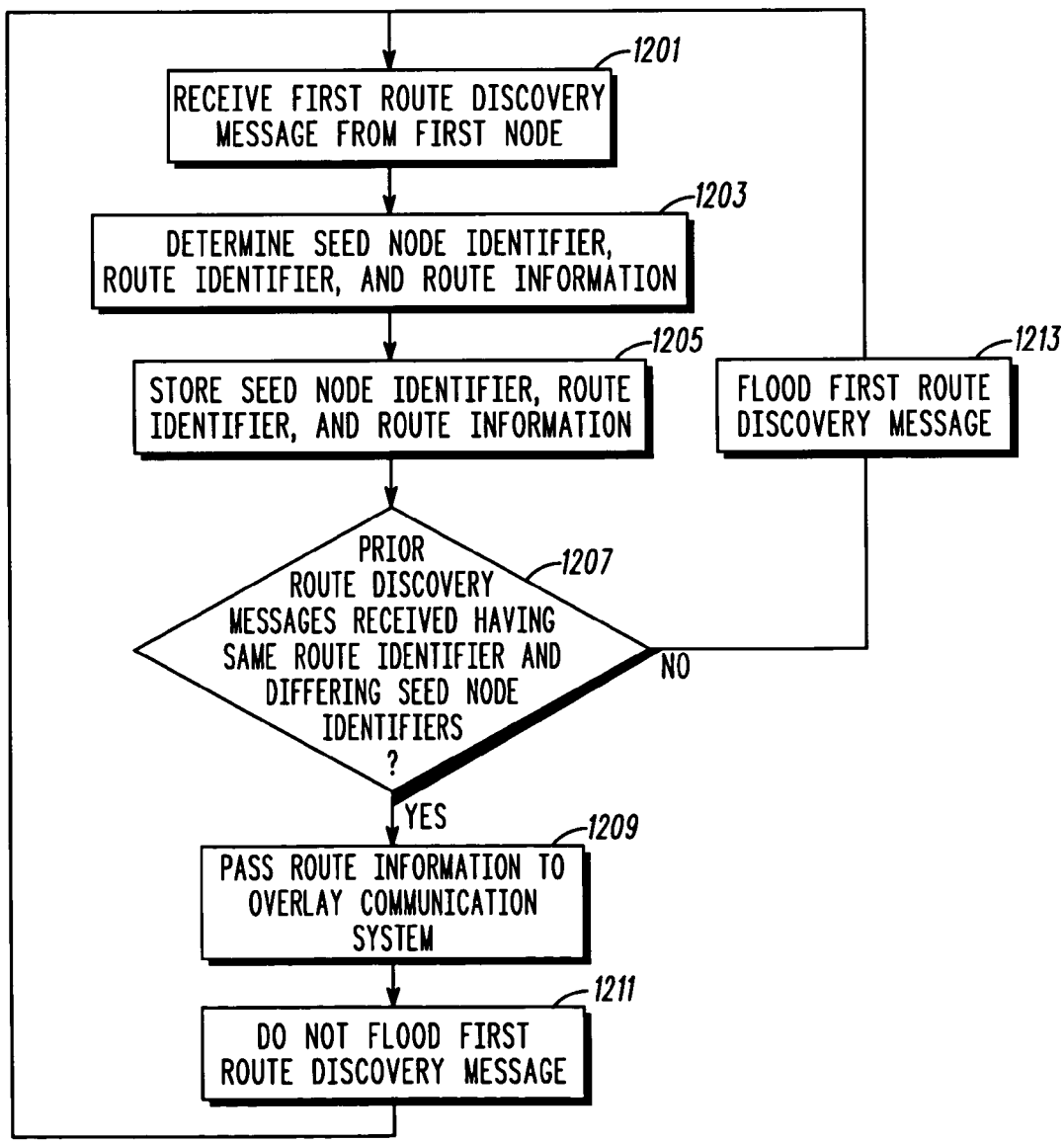

FIG. 12 is a flow chart showing operation of node 900 acting as a third node within communication system 100. In particular, a first node wishes to discover a route to a second node. The third node aids in route discovery by transmitting route information to the overlay communication system when two flood messages are received from differing seeds having the same route identifier. The logic flow begins at step 1201 where a first route discovery message (flood message) is received by receiver 902 from a first seed node. The message is analyzed by logic circuitry 901 to determine a seed node identifier, a route identifier, and route information (step 1203). This information is stored in storage 904 at step 1205. At step 1207 logic circuitry 901 analyzes storage 904 to determine if prior flood messages were received having different seed node identifiers and similar route identifiers. If the above is true, then the logic flow continues to step 1209 where route obtained from the two flood messages (i.e., the route between the two seed nodes) is passed to overlay the overlay communication system and a FLOOD_STOP message is received at step 1211. If, at step 1207, logic circuitry 901 determines that the first and the second seed identifiers do not differ, or that the first and the second route identifiers do differ, then the logic flow continues to step 1213 where the message is rebroadcast as part of standard flooding, and the logic flow returns to step 1201.

Figure 13:
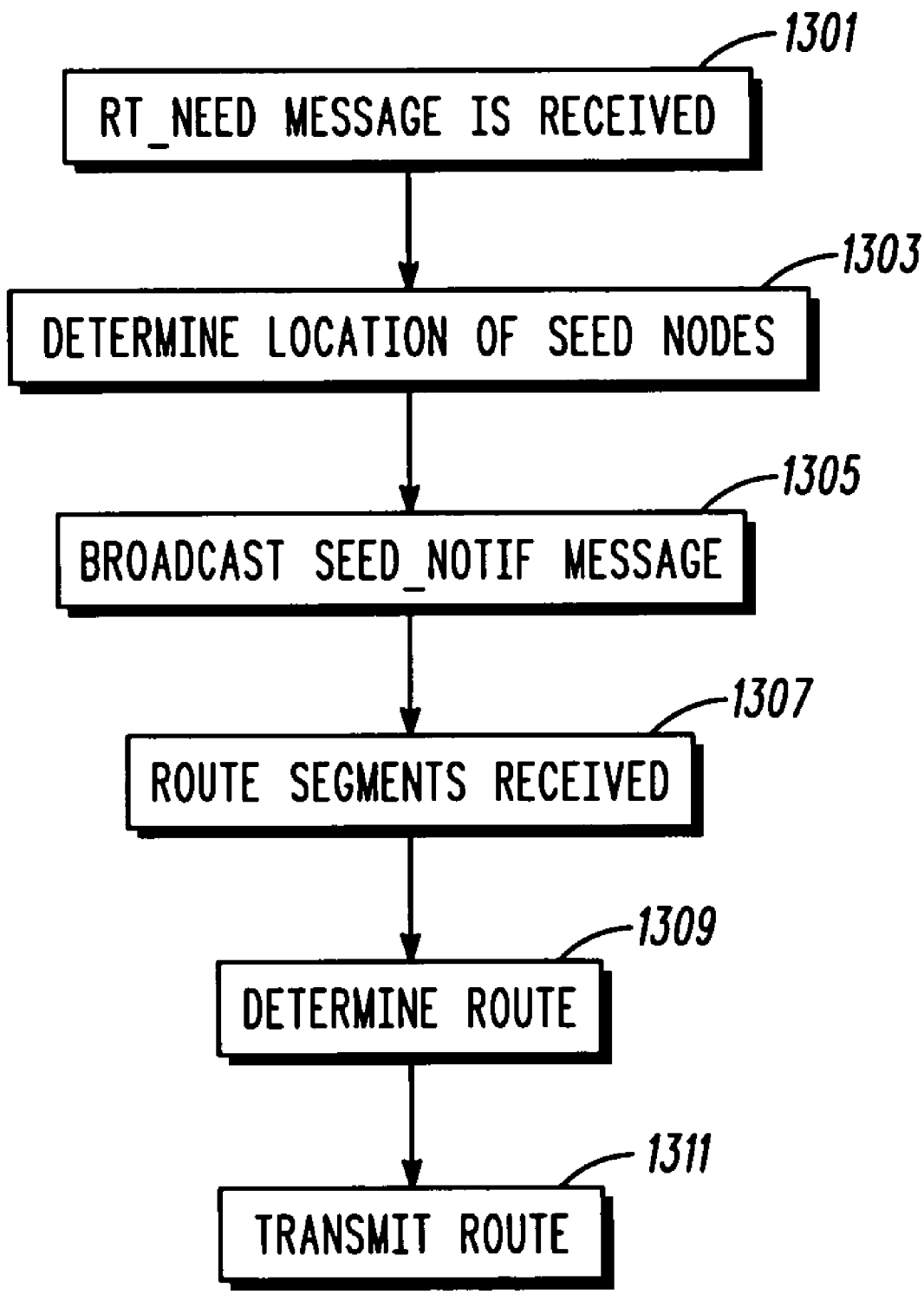

FIG. 13 is a flow chart showing operation of an overlay communication system. The logic flow begins at step 1301 where a receiver within the overlay communication system receives a message (RT_NEED) from a first node in an underlay communication system. As discussed above, the RT_NEED message is an indication to the overlay communication system that route information is needed form the first node to a second node within the underlay communication system, and contains identification information identifying both the first and the second nodes. In response, logic circuitry 901 determines the locations of seed nodes within the underlay communication system (step 1303) and broadcasts a message (SEED_NOTIF) to the seed nodes causing the seed nodes to begin broadcasting route discovery messages (step 1305). At step 1307 a plurality of route segments are received from various nodes within the underlay communication system. As discussed above, the route segments contain route information between two seeds. From the route segments, logic circuitry determines a route between the first and the second nodes within the underlay communication system (step 1309). Finally, at step 1311 the route is transmitted to the first node within the underlay communication system.

While the invention has been particularly shown and described with reference to a particular embodiment, it will be understood by those skilled in the art that various changes in form and details may be made therein without departing from the spirit and scope of the invention. For example, overlay network 120 may execute a step where after receiving a first ROUTE_INFO message, controller 901 sets a timer waiting to see if additional ROUTE_INFO messages are received before broadcasting the FLOOD_STOP message. This will enable alternate routes to be discovered for redundancy. If additional routes are identified by the time the timer expires, then a list of routes is sent to the first node by the overlay network controller. It is intended that such changes come within the scope of the following claims.

The invention claimed is:

1. A method of operating an overlay communication system, the method comprising the steps of:
receiving a route needed message from a first node in an underlay communication system, wherein the route-needed message notifies the overlay communication system that a route is needed between the first and a second node within the underlay communication system;
determining locations for seed nodes within the underlay communication system;
transmitting a message to the seed nodes causing the seed nodes to begin broadcasting route discovery messages;
receiving a plurality of route segments from nodes within the underlay communication system;
determining route based on the route segments; and
transmitting the route to the first node.

2. The method of claim 1 wherein the step of transmitting the message to the seed nodes comprises the step of transmitting a rout identifier to the seed nodes identifying a particular route to be discovered.

3. The method of claim 1 wherein the step of receiving the route needed message comprises the step of receiving a message comprising identification of the first node and the second node.

4. The method of claim 1 wherein the step of receiving the plurality of route segments comprises the step of receiving a plurality of route segments, wherein each route segment comprises a route between two seeds.

5. The method of claim 1 wherein the step of determining locations for seed nodes within the underlay communication system comprises the step of determining nodes nearest a line connecting a source node and a destination node.

6. A method for operating a node within an ad-hoc communication system, the method comprising the steps of:
receiving a first route-discovery message;
determining from the first route-discovery message, an identification of a first seed node that originated the first route-discovery message;
determining a first route identifier from the first route-discovery message;
determining if a prior-received route-discovery messages was received from a differing seed node containing a similar route identifier; and
transmitting route information obtained from the two route-discovery messages to an overlay communication system based on a determination that a prior-received route-discovery messages was received from a differing seed node containing a similar route identifier.

7. The method of claim 6 wherein the step of transmitting route information comprises the step of transmitting a route between two seed nodes.

8. An apparatus existing within an overlay communication system, the apparatus comprising:
  a receiver, receiving a plurality of route segments from a plurality of nodes within an underlay communication system;
  logic circuitry determining a route between a first and a second node within the underlay communication system, wherein the route is determined from the plurality of route segments; and
  a transmitter, transmitting the route to the first node within the underlay communication system.

9. The apparatus of claim 8 wherein the receiver comprises a receiver within a cellular communication system.

10. An apparatus existing within an underlay communication system, the apparatus comprising:
  a receiver receiving a first and a second route-discovery message from a first and a second node;
  logic circuitry determining a first and a second route identifier from the first and the second route-discovery messages, and additionally determining if the first and the second route identifiers are similar; and
  transmission circuitry transmitting route information obtained from the first and the second route-discovery messages when the first and the second route identifiers differ.

11. The apparatus of claim 10 wherein the route information comprises a route between the first and the second node.

* * * * *